Jan. 13, 1970 W. ANGST 3,489,020
DRIVE MECHANISM FOR A TO-AND-FRO MOVABLE CARRIAGE
Filed Sept. 25, 1967
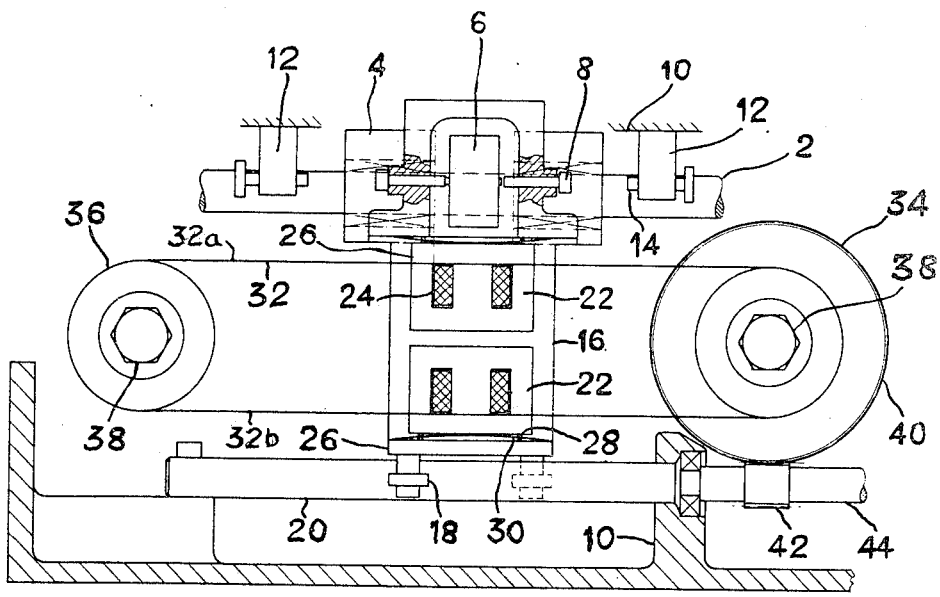
INVENTOR:
WALTER ANGST
By Jacobi & Davidson

United States Patent Office

3,489,020
Patented Jan. 13, 1970

3,489,020
DRIVE MECHANISM FOR A TO-AND-FRO MOVABLE CARRIAGE
Walter Angst, Kloten, Switzerland, assignor to Meteor AG, a corporation of Switzerland
Filed Sept. 25, 1967, Ser. No. 670,289
Claims priority, application Germany, Sept. 29, 1966, M 56,461
Int. Cl. F16h *19/06*
U.S. Cl. 74—37    4 Claims

ABSTRACT OF THE DISCLOSURE

A drive mechanism for a to-and-fro movable carriage comprising a pair of spaced roller members, one of which can be driven, with an endless band member trained about the aforesaid pair of spaced roller members. A carriage is provided which supports a pair of clamping means, each of which cooperate with a given one of the band runs of the endless band member. Each of the clamping means comprises an electromagnet having a movable armature member serving as a clamping element, and each electromagnet further includes a core portion fixedly mounted to the carriage. Each movable armature is located at the side of the associated band run which is opposite to the associated core portion. Further, there is utilized means for resiliently loading the movable armature members in the direction of the associated fixedly mounted core portion, and means are provided for alternatingly rendering operable the clamping means in order to entrain the carriage by means of the band member.

BACKGROUND OF THE INVENTION

The present invention relates to an improved drive mechanism for a to-and-fro movable or reciprocable carriage or slide, especially for the wire-guide mechanism of a winding machine.

With wire-guide mechanisms of winding machines there exists the necessity of quickly carrying out the reversal of movement at the ends of the path of travel or stroke of the wire-guide mechanism, in order to cleanly deposit or wind the wire in layers. This operation partakes of increased significance the greater the rotational speed of winding, since in this case even relatively small delays in movement reversal can result in a piling up of the windings at the spool ends. Apart from the problems concerning the retardation and acceleration of the mass of the carriage carrying the wire-guide mechanism, there also exists the difficulty of disconnecting such carriage as quickly as possible and without any delay in time from its feed element for projecting it in one direction and to bring it into operable association with the feed element which propels the carriage in the other direction.

SUMMARY OF THE INVENTION

Accordingly, it is a primary object of the present invention to provide an improved drive mechanism which is capable of effectively overcoming these difficulties.

Another, more specific object of this invention relates to the provision of an improved drive mechanism which is relatively simple in construction, extremely reliable in operation, and effective in reversing the movement of a carriage, particularly the carriage for the wire-guide mechanism of a winding machine, without any appreciable time delay.

Yet a further noteworthy object of this invention concerns a drive mechanism for reciprocating a carriage for the wire-guide mechanism of a winding machine in an extremely effective manner, so that there is positively prevented piling up of the wire coils upon the spools, thus insuring for neat, clean, and effective wire wrapping operation upon an associated spool.

Now, in order to achieve these and further objects of the invention which will become more readily apparent as the description proceeds, the inventive drive mechanism is of the type incorporating an endless band member which passes about two rollers which are spaced from one another, wherein at least one of these rollers is driven. Furthermore, the reciprocal carriage or sled member carries a pair of clamping elements, each run of the band member being operably associated with a clamping element. Further, means are provided for alternatively rendering operable the clamping elements in order to entrain the carriage by means of the band member. According to an important aspect of the invention the movable armatures of electromagnet means serve as the clamping elements. These armatures are always located at the side of the run of the band member which is disposed opposite to the associated core portions which are fixedly mounted to the carriage. Additionally, the movable armatures are spring loaded in the direction of the fixedly mounted core portions.

BRIEF DESCRIPTION OF THE DRAWING

The invention will be better understood, and objects other than those set forth above, will become apparent, when consideration is given to the following detailed description thereof. Such description makes reference to the annexed drawing wherein the single figure schematically depicts an exemplary embodiment of inventive drive mechanism.

DESCRIPTION OF THE PREFERRED EMBODIMENT

Describing now the drawing, it should be understood that reference numeral 2 is a guide rod which is appropriately secured or mounted at its opposed ends in a housing 10 of a winding machine. A carriage or sled 4 is displaceably mounted upon the guide rod 2 and carries a schematically illustrated reversing switch means 6. Operably associated with each side of this reversing switch means 6 is a respective actuation bolt member 8 which is displaceably mounted at the carriage 4 parallel to the direction of movement of the latter. Stop or impact screws 14 are provided at both ends of the path of travel of the carriage 4 and they are arranged at flange or flap members 12 of the housing 10 substantially coaxial with respect to both of the actuation bolts 8. As should be apparent, the actuation bolts 8 impinge against the stop screws 14 in order to actuate the reversing switch means 6.

Continuing, it will be recognized that the carriage 4 is connected with a support or carrier portion 16 which extends substantially transverse to the direction of motion of the reversing switch means 6. Two guide rollers 18 are supported at the free end of the carrier or support portion 16, as shown. A guide rail 20 which is directed substantially parallel to the guide rod 2 and is straddled by the rollers 18, prevents a rocking or tilting of the carriage 4 about the guide rod 2. Further, two electromagnets 22 provided with coils or windings 24 are mounted upon the carrier portion 16. A movable, substantially plate-shaped armature 26 is associated with each electromagnet 22. Each such armature 26 extends substantially parallel to the direction of movement of the carriage 4. The armatures 26 are mounted for movement in a direction transverse to the direction of movement of the carriage 4, upon pin members 28 which are anchored in the carrier portion 16 and the carriage or sled 4, respectively.

A respective blade or leaf spring 30 is arranged between each movable armature 26 and the associated carrier portion 16 or the associated carriage 4, and is secured against displacement by means of the pin members 28. These blade or leaf springs 30 strive to press the associated armature 26 against the electromagnets 22.

Furthermore, by inspecting the drawing it will be recognized that a respective run of an endless steel band member 32 or the like travels between the electromagnets 22 and their movable armatures 26. This band member 32 is trained on the one hand over a drive roller 34 and, on the other hand, over a deflecting or turning roller 36. The rollers 34 and 36, possessing the same diameter, are fastened upon axle journals 38 extending in parallelism with one another and conjointly transverse to the direction of movement of the carriage 4. Consequently, the band runs 32a and 32b of the steel band member 32 likewise extend parallel to the path of travel of the carriage 4. A worm gear 40 is rigidly connected for rotation with the drive roller 34. This worm gear 40 meshes with a worm 42 of a drive shaft 44 which is mounted in the housing 10.

During operation of the inventive apparatus, the steel band member 32, which is driven via the shaft 44, the worm 42, the worm gear 40 and the roller 34, travels continuously in the same direction. At the same time, one of both coils or windings 24 of the electromagnets 22 is always disposed, by means of the reversing switch means 6, in a current circuit of a non-illustrated current source. Consequently, one or the other of the electromagnets 22 is continuously excited and attracts its armature 26, so that the lines of force are closed via the intermediately disposed band run 32a or 32b and such band run is clamped between the associated armature 26 and the associated electromagnet 22. Depending upon which band run 32a or 32b is temporarily clamped the carriage 4 is therefore entrained in the one or the other direction of motion, until the thus advancing actuation bolt 8 impinges against the associated impact screw 14. When this happens the reversing switch means 6 is actuated, which then interrupts the current circuit to the previously excited electromagnet 22 and at the same time applies current to the coil or winding 24 of the other electromagnet 22. The armature 26 of the previously excited electromagnet 22 then releases the associated band run of the steel band member 32, whereas the oppositely situated band run is immediately again clamped by its associated armature 26. Now, the carriage 4 is displaced in the opposite direction, until the described reversing operation repeats at the other end of the path of travel of the carriage 4 which is limited by the adjustment of the impact or stop screws 14. The stroke of the non-illustrated, conventional wire-guide mechanism which is secured to the carriage 4 is dependent upon the adjustment of the screws 14 which can be changed quite easily by undertaking very simple manual manipulations.

It is of particular significance that the armatures 26 also contact the corresponding or associated band run 32a or 32b of the band member 32 when the associated electromagnet 32 is without current, which operation is obtained by providing the blade or leaf springs 30 with a small pre-stress. Consequently, during the reversing operation it is therefore not necessary to initially have the electromagnets or armatures first overcome an air gap. On the contrary, the clamping of the corresponding band run upon excitation of the associated electromagnet is carried out without any time delay. The friction which prevails between the steel band member 32 and the armatures 26 or electromagnets 22 in the currentless condition, is negligible owing to the small pre-stress of the leaf or blade springs 28.

While there is shown and described a present preferred embodiment of the invention, it is to be distinctly understood that the invention is not limited thereto, but may be otherwise variously embodied and practiced within the scope of the following claims. Accordingly, what is claimed is:

1. A drive mechanism for to-and-fro movable carriage comprising, in combination:
    (a) a pair of spaced roller members, at least one of which is adapted to be driven;
    (b) an endless band member having two runs and trained about said pair of spaced roller members;
    (c) a carriage;
    (d) a pair of clamping means carried by said carriage, each of said clamping means cooperating with a given one of said band runs;
    (e) each of said clamping means comprising an electromagnet having a movable armature member serving as a clamping element, each electromagnet further including a core portion fixedly mounted to said carriage, each movable armature being located at the side of the associated band run which is opposite to the associated core portion;
    (f) means for resiliently loading said movable armature members in the direction of the associated fixedly mounted core portion; and
    (g) means for alternatingly rendering operable said clamping means in order to entrain said carriage by means of said band member.

2. A drive mechanism as defined in claim 1, wherein each of said movable armature members comprises a plate means, and pin means for guiding said plate means 3. A drive mechanism as defined in claim 1, wherein said resilient loading means comprises leaf spring means for loading the associated movable armature member.

4. A drive mechanism as defined in claim 1, wherein said means for alternatingly rendering operable said clamping means includes reversing switch means.

References Cited

UNITED STATES PATENTS 2,847,859   8/1958   Lynott _____ 74—37

FOREIGN PATENTS 149,104   8/1920   Great Britain.

FRED C. MATTERN, Jr., Primary Examiner

W. S. RATLIFF, Jr., Assistant Examiner